(12) United States Patent
Nokura et al.

(10) Patent No.: US 8,683,890 B2
(45) Date of Patent: Apr. 1, 2014

(54) STEERING WHEEL

(75) Inventors: Kunihiro Nokura, Kiyosu (JP);
Yukihito Inoue, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 17 days.

(21) Appl. No.: 13/285,881

(22) Filed: Oct. 31, 2011

(65) Prior Publication Data
US 2012/0240720 A1    Sep. 27, 2012

(30) Foreign Application Priority Data

Mar. 24, 2011    (JP) ................................. 2011-066046

(51) Int. Cl.
*G05G 1/10*        (2006.01)
(52) U.S. Cl.
USPC .............................. 74/558; 74/552
(58) Field of Classification Search
USPC ............................ 74/552, 551.2, 558; 16/421
See application file for complete search history.

(56) References Cited

U.S. PATENT DOCUMENTS

| | | | | |
|---|---|---|---|---|
| 2,197,409 A * | 4/1940 | Jackson | ........................... | 74/558 |
| 2,623,405 A * | 12/1952 | Sampson | ........................ | 74/552 |
| 3,726,152 A * | 4/1973 | Tsuneizumi | .................... | 74/552 |
| 3,802,291 A * | 4/1974 | Young et al. | .................... | 74/552 |
| 4,920,822 A * | 5/1990 | Abiko | .............................. | 74/552 |
| 5,681,243 A * | 10/1997 | Criss | ................................. | 482/49 |
| 6,386,579 B1 * | 5/2002 | Reidy et al. | ................... | 280/731 |
| 6,494,114 B1 * | 12/2002 | Schuler | ............................. | 74/558 |
| 6,668,683 B2 * | 12/2003 | Fleckenstein | ................... | 74/552 |
| 6,892,607 B2 * | 5/2005 | Hayashi et al. | ................. | 74/558 |
| 6,918,317 B2 * | 7/2005 | Lee | .................................... | 74/558 |
| 8,047,097 B2 * | 11/2011 | Worrell et al. | .................. | 74/552 |
| 8,047,098 B2 * | 11/2011 | Park | .................................. | 74/552 |
| 2002/0062712 A1 * | 5/2002 | Miltenberger | .................. | 74/552 |
| 2010/0101364 A1 * | 4/2010 | Seidl | ................................ | 74/552 |
| 2012/0073401 A1 * | 3/2012 | Groleau et al. | ................. | 74/552 |

FOREIGN PATENT DOCUMENTS

| | | | | |
|---|---|---|---|---|
| JP | A-60-219159 | 11/1985 | | |
| JP | 61132463 A * | 6/1986 | ............... | B62D 1/06 |

* cited by examiner

*Primary Examiner* — Marcus Charles
*Assistant Examiner* — Adam D Rogers
(74) *Attorney, Agent, or Firm* — Posz Law Group, PLC

(57) ABSTRACT

A steering wheel includes a generally annular ring section to be hand held for steering a vehicle, and the ring section includes a core member and a cladding layer that covers an outer circumference of the core member all over. The hardness of the cladding layer is varied in a circumferential direction of a cross section of the ring section in which the core member is located at the center. An occupancy by a soft region is greater in a first region of the cladding layer located on a side facing toward a rotation center axis of the ring section than in a second region of the cladding layer located on a side facing away from the rotation center axis, such that the hardness in the first region is lower than that in the second region.

4 Claims, 9 Drawing Sheets

STEERING WHEEL

CROSS REFERENCE TO RELATED APPLICATIONS

The Present application claims priority from Japanese Patent Application No. 2011-066046 of Nokura et al., filed on Mar. 24, 2011, the disclosure of which is hereby incorporated into the present application by reference.

BACKGROUND OF THE INVENTION

1. Field of the Invention

The present invention relates to a steering wheel which has a generally annular shaped ring section to be hand held for steering a vehicle.

2. Description of Related Art

In a known steering wheel, a ring section is comprised of a core member and a cladding layer that covers an entire outer circumference of the core member. The cladding layer is usually fabricated of a soft synthetic resin such as polyurethane or a hard material such as wood. When a driver holds the ring section by hands, the contact area between hands and the ring section, and the pressure distribution in the contact area are not uniform. Therefore, in order to feel comfort in holding a steering wheel, hardness of the cladding layer is desirably varied in a circumferential direction of a cross section of the ring section in which the core member is located at the center.

JP 60-219159 discloses a steering wheel wherein a cladding layer is comprised of two different materials; a first material located on an upper area as the steering wheel is mounted on a vehicle and a second material located on a lower area as mounted on a vehicle. However, this reference has no teaching on a difference in hardness in a circumferential direction of a cross section of the ring section.

SUMMARY OF THE INVENTION

An object of the present invention is to provide a steering wheel that gives a driver comfort in holding it.

The object of the invention will be achieved by a following steering wheel:

The steering wheel is provided with a generally annular ring section to be hand held for steering a vehicle, and the ring section includes a core member and a cladding layer that covers an outer circumference of the core member all over. A first region of the cladding layer located on a side facing toward a rotation center axis of the ring section has a greater occupancy by a soft region than in a second region of the cladding layer located on a side facing away from the rotation center axis, such that the hardness in the first region is lower than that in the second region.

With this configuration, the soft region is located in the first region of the cladding layer which is located on the side facing toward the rotation center axis of the ring section in order to lower the hardness of the first region relative to that of the second region which is located on the side facing away from the rotation center axis of the ring section, such that the hardness of the cladding layer varies in a circumferential direction of a cross section of the ring section in which the core member is located at the center. More specifically, when a driver holds a steering wheel by the hands, his fingertips usually contact with the first region facing toward the rotation center axis of the ring section. In this region, a contact area with the hands and a pressure given by the hands are not so great. On the other hand, when a driver holds a steering wheel by the hands, his palm contacts with the second region facing away from the rotation center axis of the ring section, and therefore, a contact area with the hands and a pressure given by the hands are great in the second region. In the steering wheel of the invention, the first region of the ring section contactable with fingertips is lower in hardness, due to the soft region located therein, than the second region contactable with a palm. This configuration will allow, when a driver holds the ring section by the hands, his fingertips to sink into the soft region while allowing his palm to be applied to a harder region over a wide area, and therefore will make the steering wheel fit comfortably in his hands in comparison with an instance where a soft region and a hard region are reversed. Further, the configuration that the second region contacting a palm is hard will help propagate the vibration in driving to the hands and notify the driver of a road surface condition.

Therefore, the steering wheel of the invention will give a driver more comfort in holding it.

Specifically, it is desired that the cladding layer is made from synthetic resin and includes a hard layer that covers an outer circumference of the core member of the steering wheel generally all over and a soft layer that covers an outer circumference of the hard layer and is lower in hardness than the hard layer, and that the soft layer has a greater thickness in the first region than in the second region.

If the cladding layer is configured as above, the cladding layer has a double layer structure of the hard layer and soft layer of different kinds of synthetic resin, and the difference in hardness between the first region and the second region is made by varying the thickness of the soft layer, thereby facilitating the manufacturing of the steering wheel.

It is further desired that the soft layer gradually thins toward the side facing away from the rotation center axis in thickness in a cross section of the ring section, and covers a generally entire outer circumference of the hard layer. This configuration will help make a tactile impression and/or an appearance of the soft layer even, and hardly make a driver aware of the difference in hardness from portion to portion.

The arrangement of the soft region may be adequately varied according to locations in the ring section that a driver holds.

By way of example, in a cross section of the ring section as mounted on a vehicle, the soft region is located in such an area that a lower end thereof is located on the side facing away from the rotation center axis relative to a center line that passes through a center of the ring core and extends generally in an up and down direction whereas an upper end thereof is located on the side facing toward the rotation center axis relative to the center line. This arrangement will be preferable for a portion located ahead of the center in a front and rear direction of the ring section, since the soft region is located in an inclined manner relative to the center line with the lower end side directed outwardly and the upper end side directed inwardly.

The soft region may also be located in such an area that upper and lower ends thereof generally conform to the center line that passes through the center of the ring core and extends generally in an up and down direction, in a cross section of the ring section as mounted on a vehicle. This arrangement will be preferable for a location in a vicinity of the center in a front and rear direction of the ring section since the soft region is located in a generally entire area of the ring section facing toward the rotation center axis relative to the center line.

Further, the soft region may be located in such an area that a lower end thereof is located on the side facing toward the rotation center axis relative to the center line that passes through the center of the ring core and extends generally in an”

up and down direction whereas an upper end thereof is located on the side facing away from the rotation center axis relative to the center line, in a cross section of the ring section as mounted on a vehicle. This arrangement will be preferable for a portion located at the rear of the center in a front and rear direction of the ring section, since the soft region is located in an inclined manner relative to the center line with the lower end side directed inwardly and the upper end side directed outwardly.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
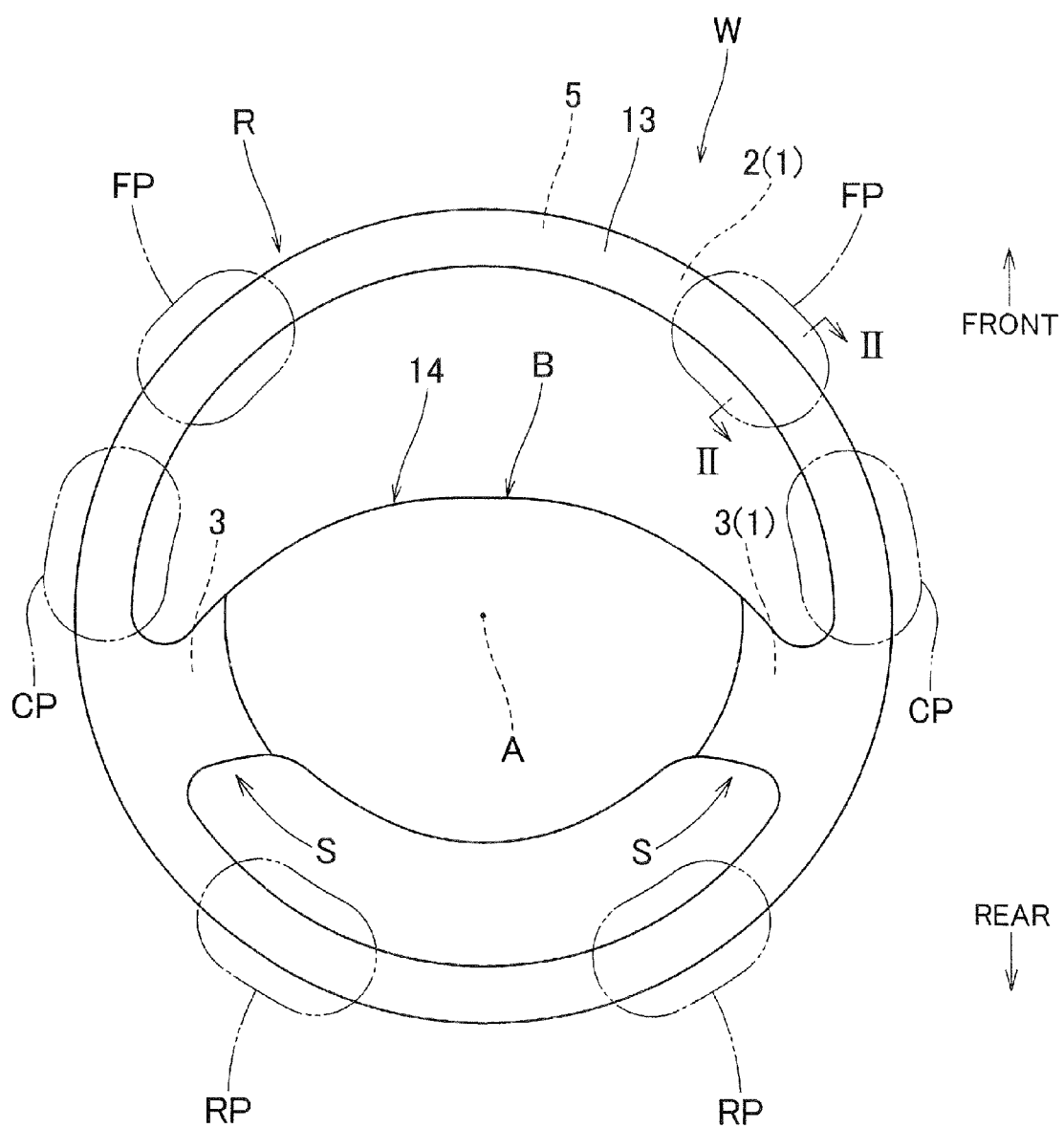
FIG. 1 is a schematic plan view of a steering wheel embodying the invention.

FIG. 1 depicts a steering wheel W embodying the invention. The steering wheel W includes a generally annular ring section R to be hand held for steering a vehicle, a boss section B located at the center of the ring section R and a plurality of (two, in this embodiment) spokes S that connect the ring section R and boss section B. As shown in FIG. 1, the spokes S in this embodiment extend outwardly and diagonally rearward from left and right end regions of the boss section B in the steering wheel W being steered straight ahead.

Unless otherwise specified, front/rear, up/down, and left/right in the embodiment are based on the steering wheel W mounted on a vehicle and steered straight ahead. Specifically, up/down is intended to refer to an up/down direction extending along an axial direction of a steering shaft (not shown) that mounts the steering wheel W on a vehicle body structure. The axial direction of the steering shaft equals to a rotation center axis A of the ring section R. Front/rear is intended to refer to a front/rear direction of a vehicle extending orthogonal to the axial direction of the steering shaft, and left/right is intended to refer to a left/right direction of the vehicle extending orthogonal to the axial direction of the steering shaft.

Figure 2:
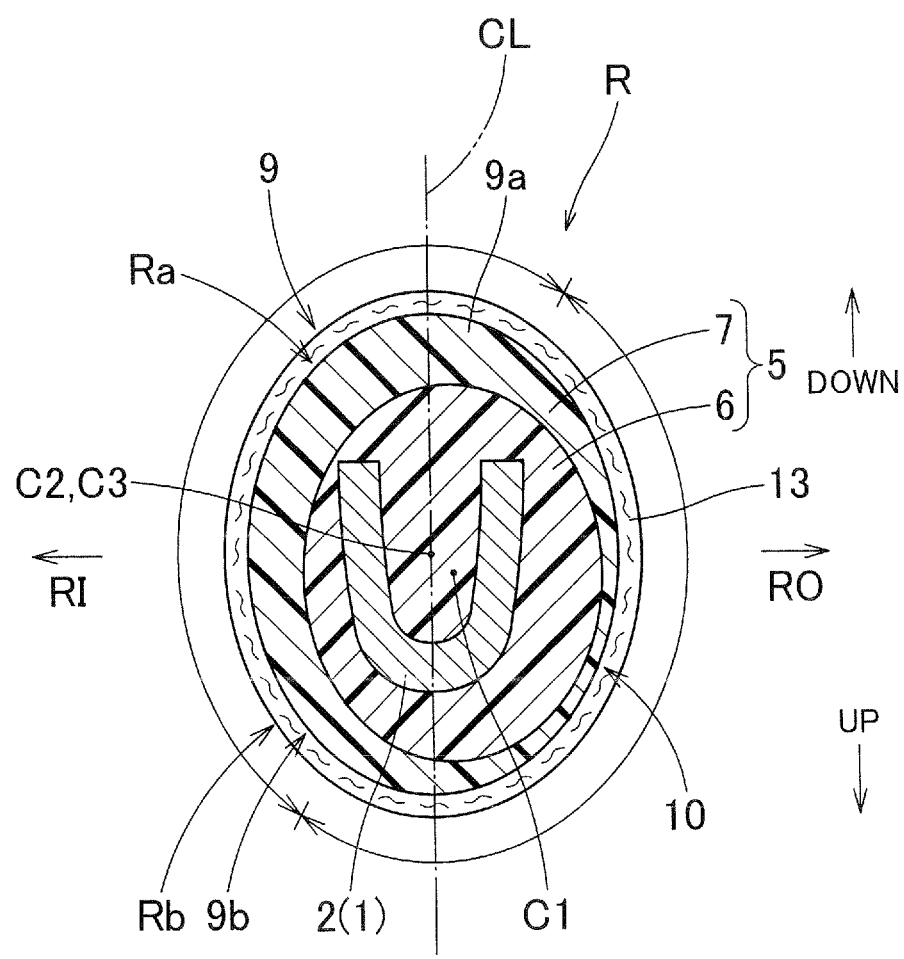
FIG. 2 is a sectional view of a ring section of the steering wheel of FIG. 1, taken along line II-II of FIG. 1.

As shown in FIGS. 1 and 2, the steering wheel W includes a wheel core (core member) 1, a cladding layer 5 and an outer skin 13. The wheel core 1 has such a contour that the ring section R, boss section B and spokes S are interconnected. The cladding layer 5 covers the core 1 at the ring section R and regions of the spokes S in the vicinity of the ring section R. The outer skin 13 covers a generally entire outer circumference of the cladding layer. The steering wheel W further includes a pad 14 that is placed over the boss section B and an unillustrated lower cover that covers an underside of the boss section B. The ring section R is comprised of a ring core (core member) 2, the cladding layer 5 that covers the ring core 2 all over and the outer skin 13 that covers the cladding layer 5.

As shown in FIG. 1, the wheel core 1 includes a ring core 2(1) (also referred as "2") that corresponds to the ring section R in location, a boss core (unillustrated) to be connected to the steering shaft and two spoke cores 3,3(1) that interconnect the boss core and ring core 2(1). As shown in FIG. 2, the ring core 2(1) has a generally inverse U shaped sectional contour that opens downwardly.

The cladding layer 5 is located at the ring core 2 and regions of the spoke cores 3, 3(1) in the vicinity of the ring section R. Referring to FIG. 2, the cladding layer 5 of the illustrated embodiment is comprised of a hard layer 6 that is located at an inner area and a soft layer 7 that is located on an outer circumference of the hard layer 6 and is lower in hardness than the hard layer 6. The cladding layer 5 has a generally oval sectional contour which is elongated in an up and down direction.

The hard layer 6 covers the ring core 2 and the regions of the spoke cores 3,3(1) in the vicinity of the ring section R generally all over. At the location of the ring section R, the hard layer 6 of the embodiment has a generally oval sectional contour which is smaller than and generally similar to that of the cladding layer 5 (or soft layer 7). A center C1 of the hard layer 6 does not conform to a center C3 of the cladding layer 5 (or soft layer 7) which equals to a center C2 of the ring core 2. The center C1 of the hard layer 6 is located slightly above the center C3 of the cladding layer 5 (or soft layer 7) and more away from the rotation center axis A of the ring section R than the center C3 of the cladding layer 5 is. Here in below, this location away from the rotation center axis A of the ring section R will be called the "peripheral side RO (of the ring section R)".

The soft layer 7 covers the hard layer 6 entirely at the ring core 2 and the regions of the spoke cores 3,3(1) in the vicinity of the ring section R. At the location of the ring section R, the soft layer 7 of the embodiment has such a generally oval sectional contour that is elongated in an up and down direction and the center C3 thereof conforms to the center C2 of the ring core 2.

That is, in the cladding layer 5 of the embodiment, since the hard layer 6 is eccentric relative to the soft layer 7 with the center C1 deviating from that of the soft layer 7, the thickness of the soft layer 7 is not uniform in a circumferential direction of a cross section of the ring section R. In the cross section of the ring section R, the soft layer 7 is thickest on a side facing toward the rotation center axis A (FIG. 1) of the ring section R (i.e., on an "inner side RI (of the ring section R)" and thins toward the peripheral side RO of the ring section R, along a circumferential direction of the cross section of the ring section R. More specifically, the center C1 of the hard layer 6 is located on the peripheral side RO of the ring section R relative to the center C3 of the soft layer 7 and slightly above the center C3 as referred to FIG. 2. Accordingly, in a cross section of the ring section R, the soft layer 7 is thickest at a lower area on the inner side RI and thins toward the peripheral side RO. The eccentricity of the hard layer 6 relative to the cladding layer 5 is generally uniform in an entire circumferential direction of the ring section R.

In this embodiment, a region of the cladding layer 5 on the inner side RI of the ring section R in which the soft layer 7 is thick will be called a "soft region" 9 whereas a region on the peripheral side RO with the thin soft layer 7 will be called a "hard region" 10. The hard region 10 is higher in hardness than the soft region 9. More specifically, the soft region 9 is so located in a cross section of the ring section R that a lower end 9a thereof is located on the peripheral side RO relative to a center line CL that passes through the center C2 of the ring core 2 and extends in an up and down direction whereas an upper end 9b thereof is located on the inner side RI relative to the center line CL.

In order for the cladding layer 5 of the embodiment to give a driver an adequate comfort in holding it, it is desired that the hard layer 6 has an Asker C hardness (SRIS 0101) of from 70 to 100 (more desirably 75 to 95) whereas the soft layer 7 has an Asker C hardness (SRIS 0101) of from 45 to 65 (more desirably 50 to 60).

The soft layer 7 may be fabricated of those which have been conventionally used to form a cladding layer of a steering wheel, such as polyurethane, silicone or the like. Polypropylene, epoxy or the like may be used to form the hard layer 6.

In this specific embodiment, the soft layer 7 is fabricated of a silicone which has an Asker C hardness (SRIS 0101) of 58 whereas the hard layer 6 is fabricated of an epoxy which has an Asker C hardness (SRIS 0101) of 89. The thickness of the thickest area of the soft layer 7 in the soft region 9 is about 10 mm whereas the thickness of the thinnest area of the soft layer 7 in the hard region 10 is determined in a region of 0 to 1 mm.

In this embodiment, the outer skin 13, which wraps around the cladding layer 5 all over, is made of such materials as natural leather or synthetic leather.

Figure 4:
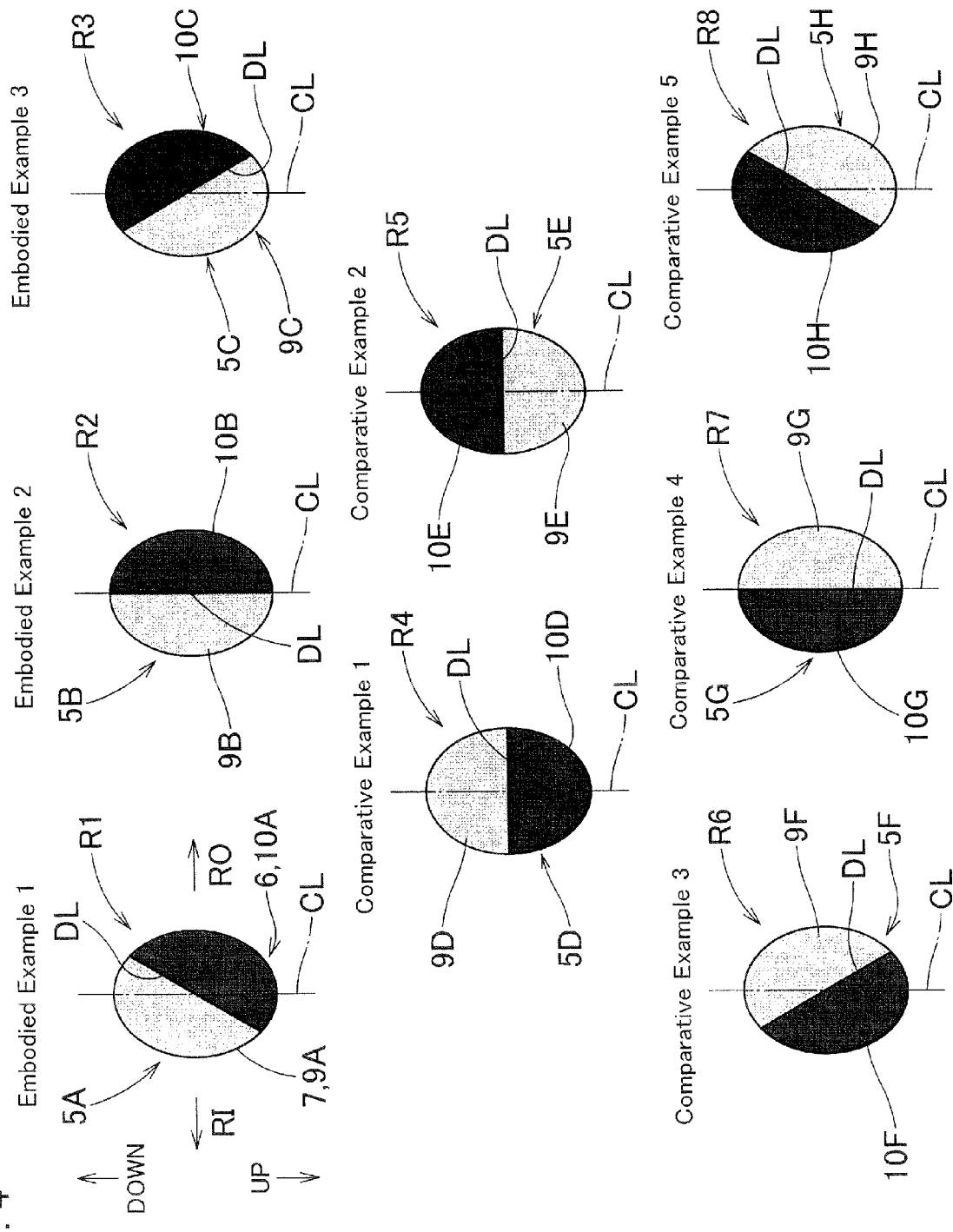
FIG. 4 depicts schematic sectional views of ring sections of embodied examples 1 to 3 and comparative examples 1 to 5 used in an evaluation test.

A test was conducted to evaluate comfort in holding eight steering wheels; 3 of which are respectively provided with ring sections R1 to R3 of embodied examples 1 to 3 that meet the requirements of the invention, and 5 of which are respectively provided with ring sections R4 to R8 of comparative examples 1 to 5 that do not meet the requirements of the invention. FIG. 4 depicts cross sections of the ring sections R1 to R8 of the steering wheels used in the test. The ring sections R1 to R8 of all the examples (embodied examples 1 to 3 and comparative examples 1 to 5) are respectively provided with such a cladding layer 5 that is halved into a soft layer 7 and a hard layer 6. That is, in each of the cladding layers 5 of the ring sections R1 to R8 of the embodied examples 1 to 3 and comparative examples 1 to 5, the soft region 9 is comprised of the soft layer 7 only whereas the hard region 10 is comprised of the hard layer 6 only. The cross sections in FIG. 4 are taken at regions of the ring sections R1 to R 8 that a driver would hold by the right hand, and an upper side in each figure refers to a lower side as mounted on a vehicle and a right hand side refers to the peripheral side RO of each of the ring sections. Similarly to the foregoing embodiment, ring cores are located at the center of each of the cladding layers 5 although they are omitted in FIG. 4.

More specifically, each of the cladding layers 5A, 5B and 5C of the ring sections R1, R2 and R3 in the embodied examples 1 to 3 has a soft region 9A, 9B and 9C on the inner side RI, and has a hard region 10A, 10B and 100 on the peripheral side RO. Particularly, in the cladding layer 5A of the ring section R1 of the embodied example 1, the soft region 9A is so arranged in the inner side RI that a lower end thereof is located on the peripheral side RO relative to a center line CL that passes through the center of the ring core and extends in an up and down direction in a cross section of the ring section R1 whereas an upper end thereof is located on the inner side RI relative to the center line CL, in a similar manner to the foregoing embodiment. That is, in the ring section R1 of the embodied example 1, the border line DL of the soft region 9A and hard region 10A is inclined relative to the center line CL with the lower side directed toward the peripheral side RO. In the cladding layer 5B of the ring section R2 of the embodied example 2, the soft region 9B is so formed on the inner side RI that upper and lower ends thereof generally conform to the center line CL in a cross section of the ring section R2. That is, the cladding layer 5B is halved at the center in an in and out direction into the soft region 9B and hard region 10B and the border line DL of the soft region 9B and hard region 10B is generally identical to the center line CL. In the cladding layer 5C of the ring section R3 of the embodied example 3, the soft region 9C is so formed on the inner side RI that a lower end thereof is located on the inner side RI relative to the center line CL in a cross section of the ring section R3 whereas an upper end thereof is located on the peripheral side RO relative to the center line CL. That is, in the ring section R3 of the embodied example 3, the border line DL of the soft region 9C and hard region 100 is inclined relative to the center line CL with the lower side directed toward the inner side RI.

In the comparative examples 1 and 2, the cladding layers 5D and 5E of the ring sections R4 and R5 are respectively generally halved into the soft region 9D/9E and hard region 10D/10E at the center in an up and down direction. More specifically, in the cladding layer 5D of the ring section R4 of the comparative example 1, the soft region 9D is located in a lower area of the ring section R4 in a cross section whereas the hard region 10D is located on an upper area of the ring section R4. The border line DL of the soft region 9D and hard region 10D extends generally along a left and right direction, generally orthogonally to the center line CL. To the contrary, in the cladding layer 5E of the ring section R5 of the comparative example 2, the soft region 9E is located in an upper area of the ring section R5 in a cross section whereas the hard region 10E is located on a lower area of the ring section R5. The border line DL of the soft region 9E and hard region 10E extends generally along a left and right direction, generally orthogonally to the center line CL.

In the comparative examples 3 to 5, each of the cladding layers 5F, 5G and 5H of the ring sections R6, R7 and R8 has a soft region 9F, 9G and 9H on the peripheral side RO, and has a hard region 10F, 10G and 10H on the inner side RI. Particularly, in the cladding layer 5F of the ring section R6 of the comparative example 3, the soft region 9F is so arranged in the peripheral side RO that a lower end thereof is located on the inner side RI relative to the center line CL in a cross section of the ring section R6 whereas an upper end thereof is located on the peripheral side RO relative to the center line CL. That is, in the ring section R6 of the comparative example 3, the border line DL of the soft region 9F and hard region 10F is inclined relative to the center line CL with the lower side directed toward the inner side RI. In the cladding layer 5G of the ring section R7 of the comparative example 4, the soft region 9G is so formed on the peripheral side RO that upper and lower ends thereof generally conform to the center line CL in a cross section of the ring section R7. That is, in the ring section R7 of the comparative example 4, the cladding layer 5G is halved at the center in an in and out direction into the soft region 9G and hard region 10G and the border line DL of the soft region 9G and hard region 10G is generally identical to the center line CL. In the cladding layer 5H of the ring section R8 of the comparative example 5, the soft region 9H is so arranged in the peripheral side RO that a lower end thereof is located on the peripheral side RO relative to the center line CL in a cross section of the ring section R8 whereas an upper end thereof is located on the inner side RI relative to the center line CL. That is, in the ring section R8 of the comparative example 5, the border line DL of the soft region 9H and hard region 10H is inclined relative to the center line CL with the lower side directed toward the peripheral side RO.

Figure 3A:
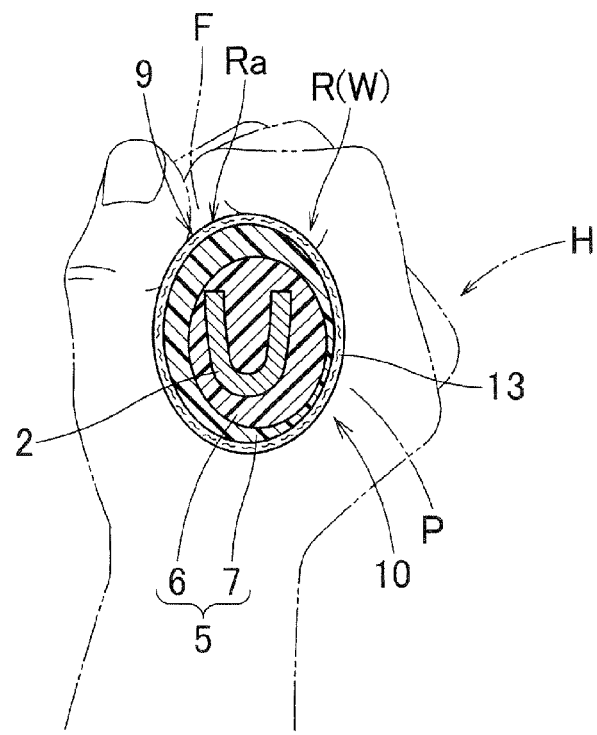
FIGS. 3A and 3B are sectional views showing the ways a driver's hand holds the ring section.
Figure 3B:
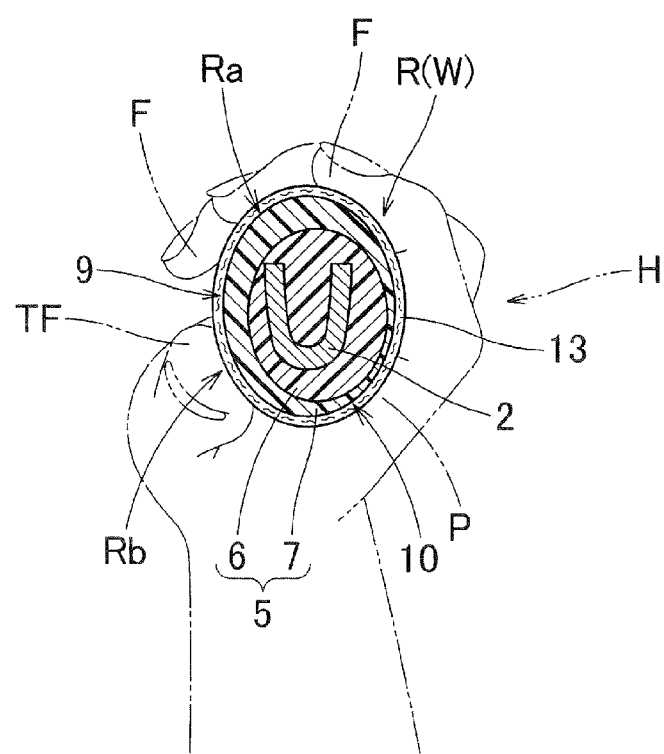
Figure 5:
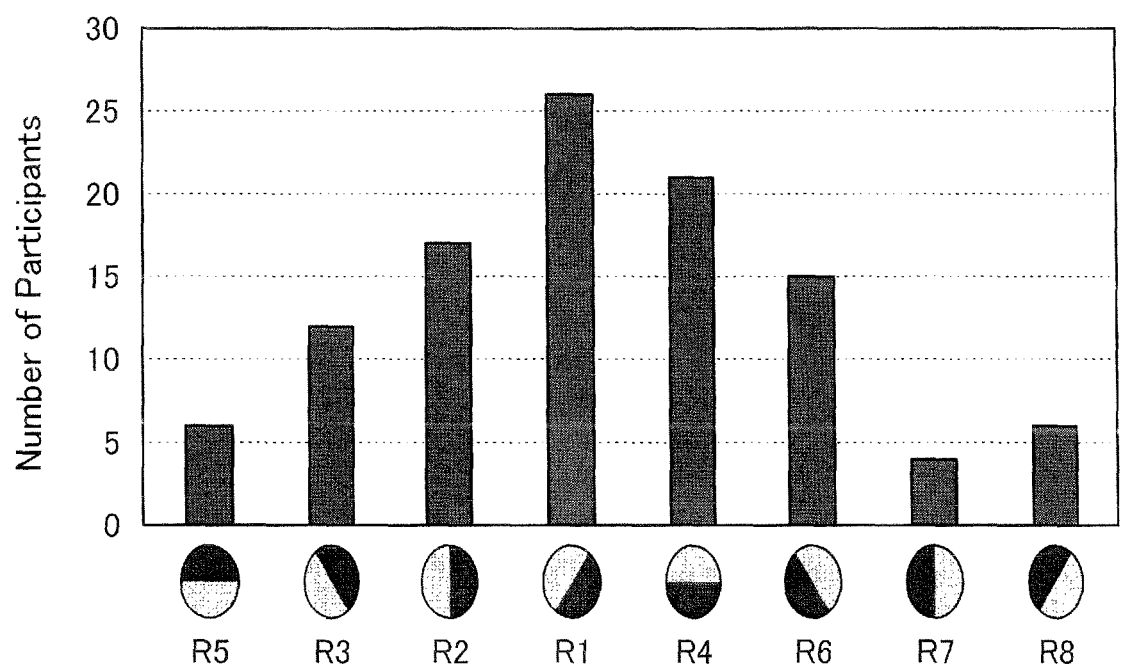
FIG. 5 is a graph showing a result of the evaluation test.
Figure 6:
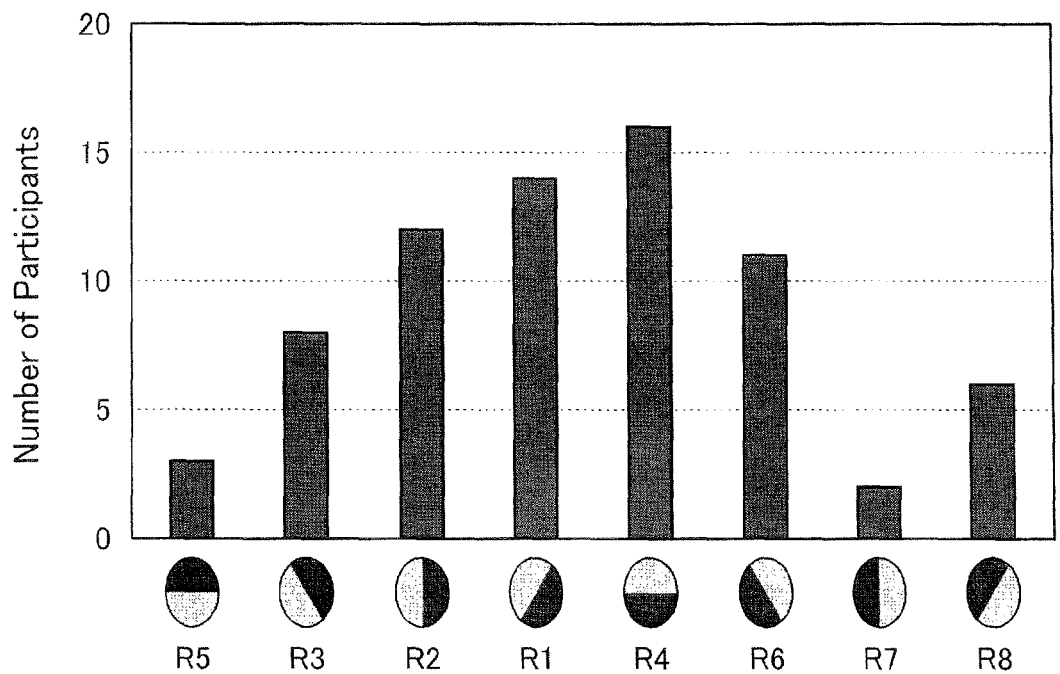
FIG. 6 is a graph showing a test result of male participants only.
Figure 7:
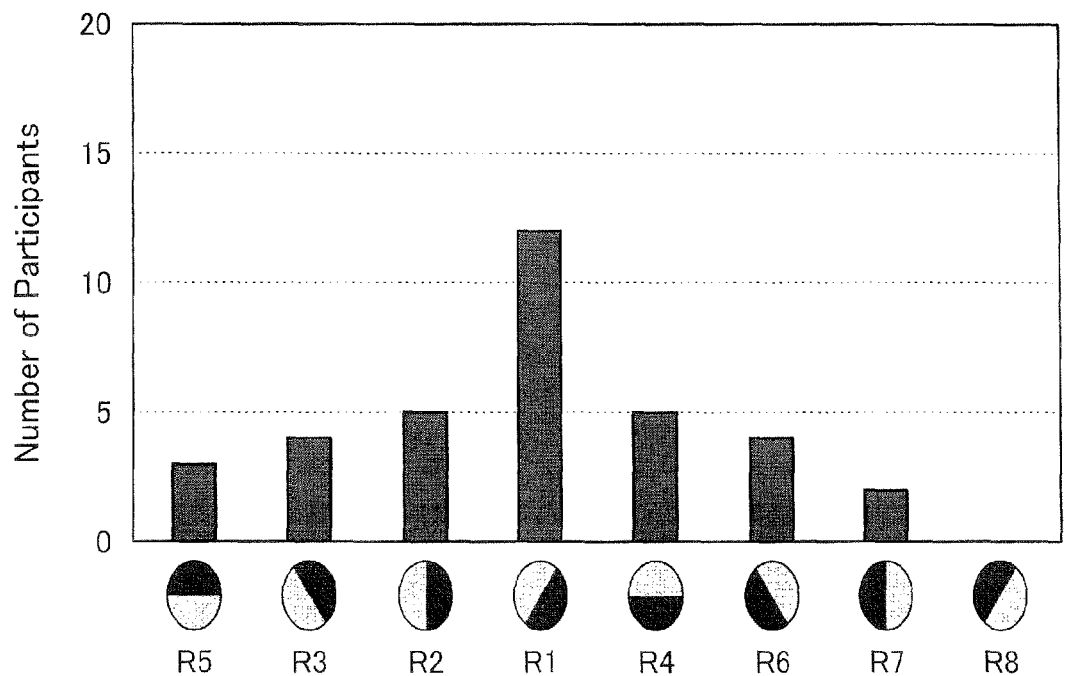
FIG. 7 is a graph showing a test result of female participants only.
Figure 9:
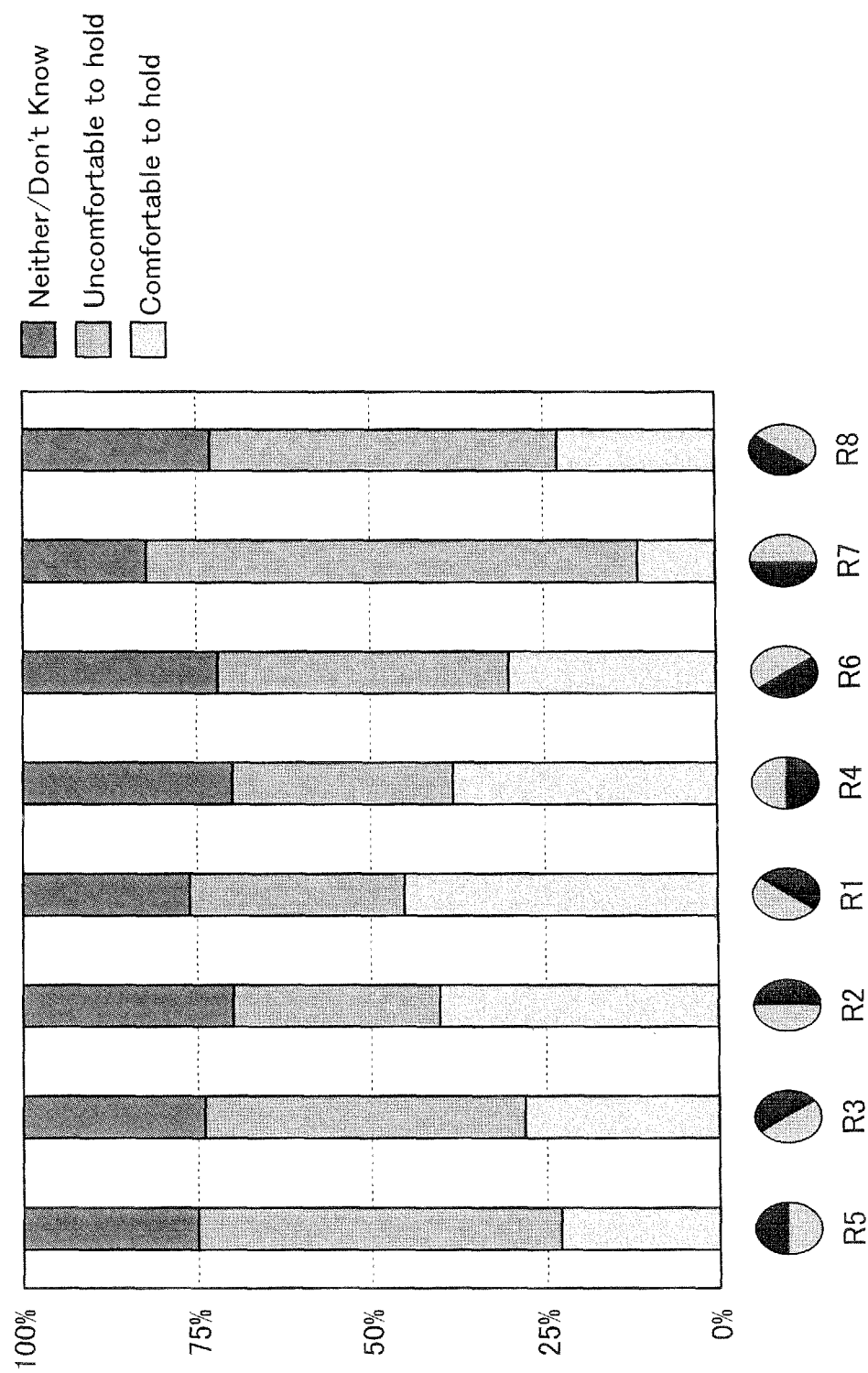
FIG. 9 is a graph that compared a comfort the participants felt in holding the ring sections of the embodied examples 1 to 3 and comparative examples 1 to 5 and that in holding a conventional steering wheel.

FIGS. 5 to 7 and 9 show results of the holding test of the steering wheels having the ring sections R1 to R8 of the embodied examples 1 to 3 and comparative examples 1 to 5. 107 (72 male, 35 female) people participated in the test. The participants were asked to hold the region FP (refer to double-dashed lines in FIG. 1) of all the ring sections R1 to R8 of the steering wheels, which region is located ahead of the center in a front and rear direction of the ring section and away from the spokes S, and answered which ring section was most comfortable to hold. FIG. 5 is a graph showing a test result on all of the participants. FIG. 6 is a graph showing a test result on the male participants only, and FIG. 7 is a graph showing a result of the female participants only. Some of the participants grasp the ring sections using a thumb as well, as shown in FIG. 3A, whereas others grasp the ring sections without using a thumb (just placing a thumb by the side of other fingers) as shown in FIG. 3B. The participants were further asked to answer which of each of the ring sections R1 to R8 or a conventional steering wheel was more comfortable to hold. FIG. 9 is a graph showing answers to the question.

FIG. 5 shows that a greatest number of the participants answered that the ring section R1 was most comfortable to hold. The reason of the test result is supposed as follows:

Firstly, comparing the ring sections R4 (comparative example 1) and R5 (comparative example 2) in which the cladding layer 5D/5E is halved at the center in an up and down direction, it is understood from FIG. 5 that four times more participants answered that the ring section R4 (comparative example 1, in which the hard region 10D was located on the upper side) was most comfortable to hold than those who answered R5 (comparative example 2) was most comfortable, in which the soft region 9E was located on the upper side. The upper region of the ring section is where a palm P of a driver contacts when grasping it. This supposes that the region contacting a palm P is desirably hard.

Considering the test results on the ring sections R6, R7 and R8 (comparative examples 3 to 5) in which the soft regions 9F, 9G and 9H are arranged on the peripheral side RO, more participants felt comfort in holding the ring section R6 (comparative example 3) than those liked the ring sections R7 or R8 the best. In the ring section R6, the soft region 9F is so arranged as to locate the lower end on the inner side RI relative to the center line CL. This region of the ring section R, i.e., the lower end region of the ring section R on the inner side RI, is the region where tips F of four fingers of a driver except a thumb contact when holding a ring section. This supposes that the region contacting fingertips F is desirably soft.

Figure 8:
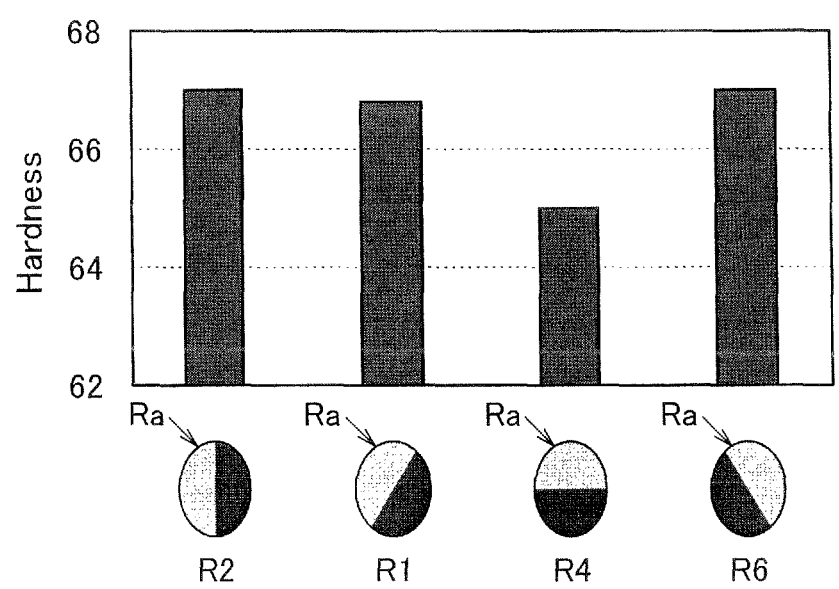
FIG. 8 is a graph showing a measurement of hardness in an inner lower region of the ring sections of the embodied examples 1 and 2 and comparative examples 1 and 3.

The graph of FIG. 6 showing the test result of the male participants only shows that a greatest number of participants answered that the ring section R4 (comparative example 1) was most comfortable to hold, and the ring section R4 is followed closely by the ring sections R1 (embodied example 1) and R2 (embodied example 2). To the contrary, the graph of FIG. 7 showing the test result of the female participants only shows that the number of the participants who liked the ring section R1 of the embodied example 1 the best was outstanding, more than two times more than those of the next greatest, the ring section R2 (embodied example 2) and R4 (comparative example 1). FIG. 8 is a graph showing measurement of hardness of the lower end regions on the inner side RI (as will be called "inner lower region" Ra, refer to FIG. 2) of the ring sections R1, R2, R4 and R6 (i.e., of the embodied examples 1 and 2 and comparative examples 1 and 3). As is understood from FIG. 8, the ring section R4 of the comparative example 1 is lowest in hardness at the inner lower region Ra, and is followed by the ring section R1 of the embodied example 1. The ring sections R2 (embodies example 2) and R6 (comparative example 3) are generally equal and highest in hardness at the inner lower region Ra. Regardless of sex, and regardless of size of a hand, the inner lower region Ra of the ring section R is the region contacting an index finger of a driver holding a steering wheel. The measurement of the hardness and the test results on a gender basis suppose that women prefers for the region contacting their index finger to be suitably soft whereas men prefers for it to be soft.

Further, in the test, the male participants were about two times as many as the female participants, and therefore, the male-female ratio was not equal. It is assumed, if the ratio had been equal, that more participants would have chosen the ring section R1 of the embodied example 1 while less participants would have chosen the ring section R4, resulting in a larger margin between the number of the participants who chose the ring section R1 and that of the participants who chose the ring section R4.

Moreover, it is known that those who holds a ring section without using a thumb as shown in FIG. 3B tend to press the thumb TF onto an upper region of the ring section R on the inner side RI firmly, without holding firmly with other fingers, in comparison with those who holds a ring section with a thumb as shown in FIG. 3A. For such type of drivers, it is desired that the soft region 9 is located on the upper region on the inner side RI of the ring section R (as will be called "inner upper region" Rb, as referred to in FIG. 2) that the thumb TF press. From this viewpoint, the ring section R4 of the comparative example 1 is not desirable.

FIG. 9 is a graph showing answers to the question "which is more confortable to hold; the ring section R1/R2/R3/R4/R5/R6/R7/R8 or the steering wheel of a vehicle that you use". From this graph, it is understood that the ring section R1 of the embodied example 1 gained a greatest number of participants who answered it is more comfortable to hold than his/her steering wheel. The embodied example 2 and the comparative example 1 follow the embodied example 1. Further, the ring section R1 gained fewer "Neither/Don't know" answers than the ring section R2 (embodied example 2) and ring section R4 (comparative example 1). This supposes that the ring section R1 of the embodied example 1 easily makes those who hold it feel comfort in comparison with conventional steering wheels.

The above test results suppose that it is desired that the region on the peripheral side RO contactable with a palm of a driver is comprised of the hard region 10 whereas the region on the inner side RI contactable with fingertips of the driver is of the soft region 9, and that the ring R1 of the embodied example 1 will be ideal since the soft region 9 thereof has lowest hardness at the inner lower region Ra (which is contactable with an index finger) and extends up to the inner upper region Rb contactable with a thumb.

In the above holding test, as is shown in FIG. 5, more participants highly evaluated the ring section R4 of the comparative example 1 than those who liked the ring section R2 of the embodied example 2 the best, and more participants highly evaluated the ring section R6 of the comparative example 3 than those who liked the ring section R3 of the embodied example 3 the best. However, the holding test aimed to evaluate the tactile impression at holding the region FP located ahead of the center in a front and rear direction of the ring sections R1 to R8 and away from the spokes S. The position a driver holds on a ring section R is not always the same during driving, and it also depends on a driver. By way of example, in a ring section R, some drivers will also hold a region CP located ahead of and adjoining the spokes S generally at the center in a front and rear direction, and some others will hold a region RP located at the rear of the center in a front and rear direction and apart from the spokes S, and the way a driver holds the ring section R varies according to the holding positions. Specifically, when holding the region FP, a driver will hold the ring section R with the back of his hand facing outwardly in a left and right direction and slightly rearward. As the position goes rearward, the back of the hand faces forward rather than outward in a left and right direction; when holding the region CP in front of and adjoining the spokes S, a driver will hold the ring section R with the back of his hand facing outwardly in a left and right direction, and when holding the region RP at the rear of and apart from the spokes S, he will hold the ring section R with the back of his hand facing forward. Accordingly, in order to pursue more comfort in holding the ring section, it is desired to change arrangement of the soft region 9 and hard region 10 of the cladding layer 5 gradually along a circumferential direction of the ring section R according to the way a driver holds each position. For example, at the region CP in front of and adjoining the spokes S generally at the center in a front and rear direction of the ring section R, the soft region 9 is desirably arranged over an entire area on the inner side RI of the ring section relative to the center line CL as in the embodied example 2, and at the region RP at the rear of the center in a front and rear direction of the ring section R and way behind the spokes S, the soft region 9 is desirably so arranged in a inclined manner as to direct the lower end inwardly and upper end outwardly relative to the center line CL as in the embodied example 3.

That is, in the cladding layer 5 of the steering wheel W in the foregoing embodiment, the soft region 9 is located on a side facing toward the rotation center axis A of the ring section R (i.e., on the inner side RI) in order to lower hardness of the region on the inner side RI relative to that of a region on a side facing away from the rotation center axis A (i.e., on the peripheral side RO), such that the hardness of the cladding layer 5 varies in a circumferential direction of the cross section of the ring section R in which the core member 2 is located at the center. More specifically, when a driver holds a steering wheel by the hands H, his fingertips F usually contact with the region on the inner side RI of the ring section R, and therefore, a contact area with the hands H and a pressure given by the hands H are not so great in the region on the inner side RI. On the other hand, when a driver holds a steering wheel by the hands H, his palm P contacts with the region on the peripheral side RO, and therefore, a contact area with the hands H, and a pressure given by the hands H are great in the region on the peripheral side RO. In the steering wheel W of the foregoing embodiment, the region on the inner side RI of the ring section R which is contactable with fingertips F is lower in hardness due to the soft region 9 located therein than the region on the peripheral side RO (or hard region 10) which is contactable with a palm P. This configuration will allow, when a driver holds the ring section R by the hands H, his fingertips F to sink into the soft region 9 while allowing his palm P to be applied to the hard region 10 over a wide area, and therefore will make the steering wheel W fit comfortably in his hands H in comparison with the above-described comparative examples 3 to 5 in which a soft area and a hard area are reversed. Further, the configuration that the region contacting a palm P is hard will help propagate the vibration in driving to the hands H and notify the driver of a road surface condition.

Therefore, the steering wheel W of the foregoing embodiment will give a driver more comfort in holding it.

In the steering wheel W of the foregoing embodiment, moreover, the cladding layer 5 is made from synthetic resin and is comprised of the hard layer 6 that covers an outer circumference of the core member 1 (i.e., ring core 2) of the steering wheel generally all over and the soft layer 7 that covers an outer circumference of the hard layer 6 and is lower in hardness than the hard layer 6. Further, the soft layer 7 has a greater thickness in the region on the inner side RI of the ring section R than in the region on the peripheral side RO of the ring section R. That is, the cladding layer 5 has a double layer structure of the hard layer 6 and soft layer 7 fabricated of different kinds of synthetic resin, and the configuration that the region on the inner side RI is comprised of the soft region 9 whereas the region on the peripheral side RO is of the hard region 10 is made by varying the thickness of the soft layer 7, thereby facilitating the manufacturing of the steering wheel W, in comparison with an instance where a cladding layer is manufactured by just locating a soft material on an inner side of the ring core while locating a hard material on an outer side of the ring core. In the foregoing embodiment, especially, since the ring core 2 has a generally inverse U shaped sectional contour, it is desired that the hard layer 6 covers an outer circumference of the ring core 2 generally all over. Without considering such an advantageous effect, it will also be appreciated to form the cladding layer just by locating a soft material on an inner side of the ring core while locating a hard material on an outer side of the ring core. Further, the material of the hard layer should not be limited only to synthetic resin, but may also be such a metallic material as aluminum.

In the foregoing embodiment, moreover, the soft layer 7 gradually thins toward the peripheral side RO in thickness in a cross section of the ring section R, and the soft layer 7 covers a generally entire outer circumference of the hard layer 6. This configuration will help make a tactile impression and an appearance of the soft layer 7 even, and hardly make a driver aware of the difference in hardness from portion to portion. If such advantageous effects do not have to be considered, the hard region may be provided with no soft layer 9 and appear on the outer surface. Although the steering wheel W in the foregoing embodiment includes on the outer surface of the cladding layer 5 (i.e., on the outer surface of the soft layer 7) a separate outer skin 13, the outer skin 13 may be omitted so a skin layer of the soft layer formed at molding of the soft layer appear on the outmost surface when the hard layer is covered by the soft layer all over.

In the foregoing embodiment, a range where the soft region 9 is arranged in the cladding layer 5 is generally uniform along an entire circumference of the ring section R as viewed from above. However, in order to give a driver more comfort, the arrangement of the soft region 9 may be adequately varied according to locations of the ring section R that a driver holds.

Figure 10:
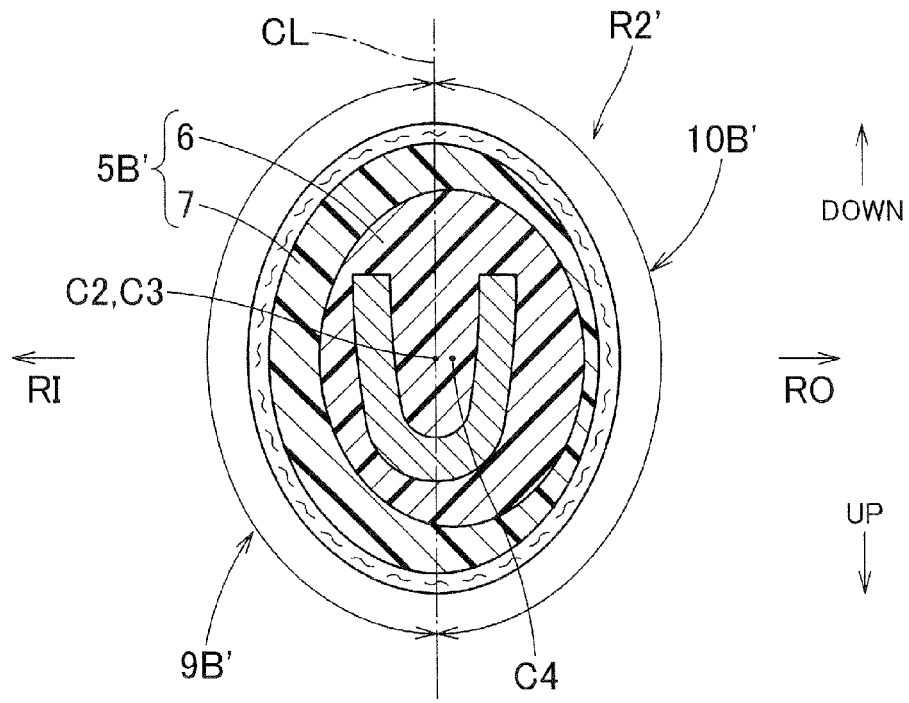
FIG. 10 is a sectional view of an alternative embodiment of a ring section.
Figure 11:
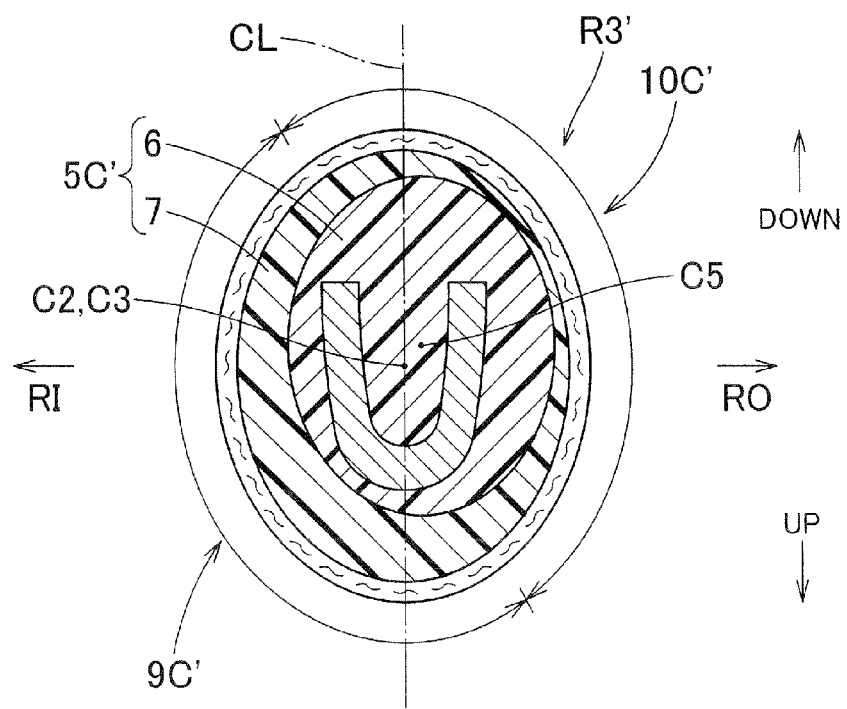
FIG. 11 is a sectional view of a further alternative embodiment of a ring section.

By way of example, the range of the soft region 9 can be varied gradually along a circumferential direction of the ring section R as viewed from above, as follows:

Referring to FIG. 1, in the region FP located ahead of the center in a front and rear direction of the ring section R and away from the spokes S, the soft region 9 may be so arranged that the lower end thereof is directed toward the peripheral side RO relative to the center line CL whereas the upper end thereof is directed toward the inner side RI relative to the center line CL, in an inclined manner, like the ring section R1 of the embodied example 1 in the above-described evaluation test or the ring section R shown in FIG. 2. In the region CP located in front of and adjoining the spoke section S generally at the center in a front and rear direction of the ring section R, a soft region 9B' may be arranged on a generally entire area of the inner side RI relative to the center line CL, like the ring section R2 of the embodied example 2 of the evaluation test or a ring section R2' shown in FIG. 10. In the ring section R2', the hard layer 6 and soft layer 7 are eccentric to each other. Specifically, the center C4 of the hard layer 6 is shifted toward the peripheral side RO relative to the center C3 of the soft layer 7. Accordingly, in a cross section of the ring section R2', the soft layer 7 is thickest generally at the center in an up and down direction on the inner side RI, and thins toward the peripheral side RO. In the region RP located at the rear of the center in a front and rear direction of the ring section R and way behind the spokes S, a soft region 9C' may be so arranged that the lower end thereof is directed toward the inner side RI relative to the center line CL whereas the upper end thereof is directed toward the peripheral side RO relative to the center line CL, in an inclined manner, like the ring section R3 of the embodied example 3 of the evaluation test or a ring section R3' shown in FIG. 11. In the ring section R3', specifically, the center C5 of the hard layer 6 is shifted toward the peripheral side RO and slightly downward relative to the center C3 of the soft layer 7. That is, the hard layer 6 is eccentric to the soft layer 7. Accordingly, in a cross section of the ring section R3', the soft layer 7 is thickest at an upper region on the inner side RI, and thins toward the peripheral side RO. If the arrangement of the soft region 9 is gradually varied along a circumferential direction of the ring section R as viewed from above like the soft region 9, (9A), 9B (9B') and 9C (9C'), the ring section R will be comfortable to hold at any location in a circumferential direction thereof. Here, although the above variation of the arrangement of the soft region 9 is determined based on hand positions for straight ahead steering, the arrangements of the soft region of the embodied examples 1 to 3 will give a driver comfort at any time in driving, including when rotating the steering wheel.

What is claimed is:

1. A steering wheel provided with a generally annular ring section to be hand held for steering a vehicle, the ring section comprising a core member and a cladding layer that covers an entire outer circumference of the core member, wherein a first region of the cladding layer located on a side of the ring section facing toward a rotation center axis of the ring section has a greater occupancy by a soft region than in a second region of the cladding layer located on a side of the ring section facing away from the rotation center axis, such that a hardness in the first region is lower than that in the second region, and a hardness of the cladding layer is varied in a circumferential direction of a cross section of the ring section in which the core member is located at the center, wherein, as viewed in the cross section of the ring section as mounted on the vehicle, a center line passes through a center of a ring core of the core member, the center line extending generally in an up and down direction, the center line dividing substantially all of the cladding layer into the first region and the second region;

wherein the cladding layer is made from synthetic resin and comprises a hard layer that covers the entire outer circumference of the core member and a soft layer that covers an outer circumference of the hard layer and is lower in hardness than the hard layer;

wherein the soft layer has a greater thickness in the first region than in the second region; and wherein the soft layer gradually thins toward the side facing away from the rotation center axis in thickness in the cross section of the ring section, and covers an entire outer circumference of the hard layer.

2. The steering wheel as in claim 1 wherein, in the cross section of the ring section as mounted on the vehicle, the soft region includes an upper end on an up side of the ring section and a lower end on a down side of the ring section, the lower end being distal from the upper end, the soft region being continuous from the upper end to the lower end, the lower end of the soft region further is located on the side facing away from the rotation center axis relative to the center line that passes through the center of the ring core, the center line extending generally in the up and down direction, and the upper end of the soft region is located on the side facing toward the rotation center axis relative to the center line.

3. The steering wheel as in claim 1 wherein, in the cross section of the ring section as mounted on the vehicle, the soft region includes an upper end on an up side of the ring section and a lower end on a down side of the ring section, the lower end being distal from the upper end, the soft region being continuous from the upper end to the lower end, the soft region is located in such an area that borders of the upper end and the lower end of the soft region generally conform to the center line that passes through the center of the ring core, the center line extending generally in the up and down direction.

4. The steering wheel as in claim 1, wherein, in the cross section of the ring section as mounted on the vehicle, the soft region includes an upper end on an up side of the ring section and a lower end on a down side of the ring section, the lower end being distal from the upper end, the soft region being continuous from the upper end to the lower end, the soft region is located in such an area that the lower end of the soft region is located on the side facing toward the rotation center axis relative to the center line that passes through the center of the ring core, the center line extending generally in the up and down direction, and the upper end of the soft region is located on the side facing away from the rotation center axis relative to the center line.

* * * * *